(12) United States Patent
Mickel et al.

(10) Patent No.: US 11,350,034 B1
(45) Date of Patent: *May 31, 2022

(54) SYSTEMS AND METHODS TO MITIGATE ADVERSE JITTER EFFECTS IN MOBILE IMAGING

(71) Applicant: General Atomics Aeronautical Systems, Inc., San Diego, CA (US)

(72) Inventors: Patrick R. Mickel, San Diego, CA (US); Matthew C. Cristina, Oceanside, CA (US); Jason A. Paxton, Poway, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/851,646

(22) Filed: Apr. 17, 2020

Related U.S. Application Data

(63) Continuation of application No. 15/963,634, filed on Apr. 26, 2018, now Pat. No. 10,645,291.

(51) Int. Cl.
  *H04N 5/225* (2006.01)
  *H04N 5/232* (2006.01)
  *H04N 5/235* (2006.01)

(52) U.S. Cl.
  CPC ......... *H04N 5/2327* (2013.01); *H04N 5/2328* (2013.01); *H04N 5/2353* (2013.01); *H04N 5/23258* (2013.01)

(58) Field of Classification Search
  CPC .................... B64C 2201/127; B64D 47/08
  See application file for complete search history.

(56) References Cited

U.S. PATENT DOCUMENTS 7,932,925 B2  4/2011 Inbar
8,792,011 B2  7/2014 Washisu
(Continued)

FOREIGN PATENT DOCUMENTS

GB    2532841    6/2016

OTHER PUBLICATIONS

Holloway, J. et al.; "Flutter Shutter Video Camera for compressive sensiving of videos"; 2012 IEEE International Conference on Computational Photography (ICCP); https://ieeexplore.ieee.org/document/6215211/; Apr. 28-29, 2012; pp. 1-11.

(Continued)

*Primary Examiner* — James M Hannett
*Assistant Examiner* — Dwight Alex C Tejano
(74) *Attorney, Agent, or Firm* — Fitch, Even, Tabin & Flannery LLP

(57) ABSTRACT

Some embodiments provide enhanced resolution imaging systems comprising: a mounting; an electro-optical image capture system; an angular jitter sensor system; an illumination source system; and an image capture control circuit is configured to: receive ling of sight displacement sensor data; obtain, during the capture frame, an angular displacement of the image capture system and monitor when the detected angular displacement of the image capture system, based on the sensor data, is beyond an angular displacement threshold envelope; and activate exposure of the image capture system to illumination, during the capture frame, when the detected angular displacement of the image capture system is within the angular displacement threshold envelope, and control a level of exposure of the image capture system to illumination, during the capture frame, when the detected angular displacement is not within the angular displacement threshold envelope.

22 Claims, 9 Drawing Sheets

(56) References Cited

U.S. PATENT DOCUMENTS

| | | | |
|---|---|---|---|
| 8,946,606 B1 | 2/2015 | Dennison | |
| 9,068,884 B1 | 6/2015 | Tillotson | |
| 9,143,689 B2 | 9/2015 | Georgy | |
| 9,239,468 B2 | 1/2016 | Webb | |
| 9,509,894 B1 | 11/2016 | Dyer | |
| 10,645,291 B1* | 5/2020 | Mickel | H04N 5/2353 |
| 2007/0129853 A1 | 6/2007 | Greenfeld | |
| 2008/0136923 A1 | 6/2008 | Inbar | |
| 2010/0141503 A1 | 6/2010 | Baumatz | |
| 2010/0238296 A1 | 9/2010 | Nakamura | |
| 2011/0193977 A1 | 8/2011 | Yamada | |
| 2014/0327789 A1 | 11/2014 | Tsuchiya | |
| 2015/0001381 A1* | 1/2015 | Shimon | G01S 17/42 250/216 |
| 2016/0171776 A1* | 6/2016 | Bridges | G01S 3/786 348/47 |
| 2016/0198088 A1 | 7/2016 | Wang | |
| 2016/0320630 A1* | 11/2016 | Donaldson | G02B 27/644 |
| 2016/0327206 A1 | 11/2016 | Yang | |
| 2016/0360086 A1* | 12/2016 | Dyer | G03B 15/006 |
| 2017/0041548 A1 | 2/2017 | Robinson | |
| 2017/0175948 A1* | 6/2017 | Zeise | F16M 11/126 |
| 2017/0227162 A1 | 8/2017 | Saika | |

OTHER PUBLICATIONS

Liu, C. et al.; "A Novel System for Correction of Relative Angular Displacement between Airborne Platform and UAV in Target Localization"; MDPI Open Access Journal—Sensors; www.mdpi.com/journal/sensors; Mar. 4, 2017; pp. 1-22.

USPTO; U.S. Appl. No. 15/963,634; Notice of Allowance dated Jan. 2, 2020.

USPTO; U.S. Appl. No. 15/963,634; Office Action dated Jul. 3, 2019.

Wang, M. et al.; "Image jitter detection and compensation using a high-frequency angular displacement method for Yaogan-26 remote sensing satellite"; Elsevier; ISPRS Journal of Photogrammetry and Remote Sensing; May 29, 2017; pp. 32-43.

Wikipedia; "Image Stabilization"; https://en.wikipedia.org/wiki/Image_stabilization; Feb. 15, 2017; pp. 1-6.

* cited by examiner

US 11,350,034 B1

SYSTEMS AND METHODS TO MITIGATE ADVERSE JITTER EFFECTS IN MOBILE IMAGING

CROSS-REFERENCE TO RELATED APPLICATION

This application is a continuation of U.S. application Ser. No. 15/963,364 filed Apr. 26, 2018, which is incorporated herein by reference in its entirety.

TECHNICAL FIELD

This invention relates generally to systems providing enhanced resolution imaging.

BACKGROUND

High resolution imaging is very important to many different commercial, military and other uses. There are many factors that can adversely affect the quality of such imaging. There is a need to improve the results of high image capturing.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
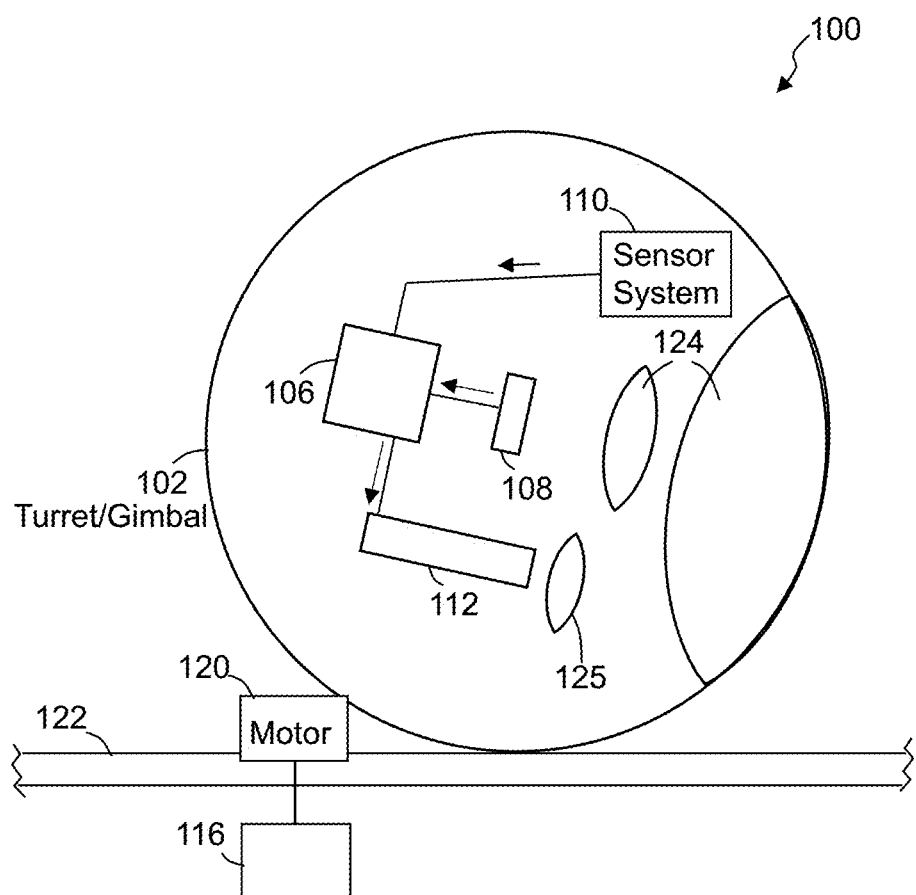
FIG. 1 illustrates a simplified block diagram of an enhanced resolution imaging system, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to capture enhanced resolution images when subject to angular jitter, such as when capturing images by imaging systems mounted on a moving platform. Some such platforms include, but are not limited to, aerial vehicles, ground based vehicles, water based vehicles, launched platforms, and other such platforms. In some embodiments, the system includes a mounting configured to secure with a body of the platform, an imaging system cooperated with the mounting, an angular jitter sensor system secured with the mounting configured to detect angular jitter noise causing line of sight (LOS) angular displacement of the imaging system, an illumination source system cooperated with the mounting, and an image capture control circuit communicatively coupled with the jitter sensor system, the illumination source system and the imaging system. The image capture control circuit, during each image capture frame, is configured to receive, in real-time, line of sight angular displacement data from the jitter sensor system, and determine, during the capture frame, an angular displacement of the imaging system and monitor when the detected angular displacement of the imaging system, based on the line of sight angular displacement data, is beyond an angular displacement threshold envelope. In some implementations, the image capture control circuit is further configured to activate exposure of the imaging system to illumination from the illumination source system when the detected angular displacement of the imaging system is within the angular displacement threshold envelope, and inhibit and/or control a level of exposure to at least decrease the exposure of the imaging system to illumination from the illumination source system, during the capture frame, when the detected angular displacement is not within the angular displacement threshold envelope. Some embodiments inhibit exposure when the detected angular displacement is not within the angular displacement threshold envelope and establish sub-integration periods of the single frame. In some implementations, the image capture control circuit is configured to control the exposure of the imaging system to illumination from the illumination source system based on detected angular displacement of the imaging system relative to one or more angular displacement thresholds, and adjust the exposure of the imaging system to illumination from the illumination source system as a function of the detected angular displacement, and in some instances as function of the detected angular displacement relative to the one or more angular displacement thresholds.

It has been identified that vibrations and other jitter caused by a moving platform (e.g., a moving vehicle) in which an imaging system is mounted can drastically affect the resolution and clarity of images captured by such imaging systems. Many low mass imaging systems exhibit enhanced platform vibration coupling. Many previous motion correction techniques with image capture systems fail to provide adequate correction in part due to limits in predicting semi-chaotic motion with sufficient precision to effectively implement mechanical corrective actions. Further, as integration times of an imaging system increase to capture an image, the angular displacement jitter of the imaging system increases. Although the signal to noise ratio may increase as the integration or frame period increases, the angular displacement of the imaging system caused by vibration and jitter can often make resulting images unusable for many applications and/or intended uses of the captured images. Conversely, however, as integration times are reduced, the signal to noise ratio typically rapidly reduces resulting in images that are often also unusable for many intended purposes. Similarly, many imaging systems have a limited link budget regarding the amount or intensity of illumination that can be emitted by one or more light sources (e.g., based on power limits, heat, operating parameters of the light source, safety, stealth, secrecy, etc.) that can significantly affect the signal to noise ratio over a given period of time (e.g., frame rate).

Many imaging systems mounted in vehicles and other moving platforms that are subject to vibration and/or movement include mechanical stabilization systems (e.g., motors, etc.) that can attempt to compensate for movement of the imaging system. Such mechanical stabilization systems, however, typically have relatively slow reaction times relative to the frequencies of vibrations and other such jitter. Accordingly, mechanical stabilization systems are ineffective in providing sufficient compensation and/or stabilization to address angular displacements of the imaging system as a result of at least some vibrations and other such jitter. Post image processing is also often ineffective in compensating for the degradation of images caused by angular displacement of the imaging system as a result of vibrations and other such jitter.

FIG. 1 illustrates a simplified block diagram of an enhance resolution imaging system 100, in accordance with some embodiments. The imaging system 100 monitors current angular displacement and controls exposure of light to an image capture system 108 and/or varies integration gain of the focal plane array. This control, in part, limits angular blur by controlling an exposure level and/or inhibiting integration of signals of a frame when there is angular displacement that is beyond one or more thresholds. The imaging system 100 includes at least one image capture control circuit 106, at least one electro-optical image capture system 108, and at least one angular jitter sensor system 110. Some embodiments further include at least one illumination source system 112. The imaging system 100 typically includes and/or is secured with a mounting 102 that is configured to secure with a body of a platform that moves. In some implementations, the imaging system 100 is configured to be mounted in or on a moving vehicle. For example, in some instances, the imaging system 100 may be secured with a frame, beam, chassis, fuselage, or other part of an aerial vehicle, a ground based vehicle, a water based vehicle, or other relevant vehicle. In some instances, the vehicle may be an unmanned vehicle that autonomously or semi-autonomously controls movement based on one or more travel paths (e.g., flight path). Similarly, the vehicle may be an unmanned vehicle that is at least partially remotely controlled from a remote location of tens of feet to thousands of miles or more. The imaging system may additionally or alternatively be utilized with other platforms that are subject to movement. Still further, the imaging system may be used on fixed location mountings, and/or while a vehicle is stopped and at least temporarily in a fixed location.

In some implementations, the mounting 102 includes movable components that allow at least part of the mounting to move relative to the body of the platform. The body may include a frame 122, one or more support structures, joists, beams, formers, stringers, ribs, chassis, fuselage, body, skin, or the like, and the mounting 102 may be secured with one or more of such structures of the platform or vehicle. The mounting 102 may include or may be a turret system, gimbal system, or other such system that can be cooperated with a moving vehicle and secure the imaging system 100. Further, the mounting may enable movement of the imaging system 100 to position the imaging system along a desired line of sight.

In some embodiments, the image capture control circuit 106 is implemented at least in part through one or more processors, microprocessors, application specific integrated circuit (ASIC), micro-controller, other such control circuitry, or combination of two or more of such control circuitry. The image capture system 108 is cooperated with the mounting. For example, the image capture system 108 may be fixed relative to the mounting system and can be positioned or moved into position with a line of sight of the image capture system 108 that is directed out of the vehicle. One or more optics 124 (e.g., lens, windows, prisms, filters, etc.) may be part of and/or positioned relative to the image capture system 108 and/or the illumination source system 112. In some embodiments, the image capture system 108 is a digital image capture system, camera or the like with an array of pixel sensors and/or light sensors (e.g., CMOS sensors, CCD sensors, etc.). Further, in some implementations, the image capture system is configured to capture images at relatively long ranges, including images from an aerial vehicle flying at heights of 30,000 ft. and higher, while capturing images with resolutions sufficient to perform accurate facial recognition of one or more persons within one or more images captured by the image capture system. Accordingly, the imaging system 100 provides enhanced resolution images for substantially any imaging when jitter and/or vibration can otherwise reduce the image quality and/or resolution.

It has been identified that line of sight jitter reduces image resolution by, for example, imprinting angular blur on images as the image sensors of the image capture system 108 move during exposure integration. As described above, some previous approaches to address this image degradation issue have attempted to physically counteract or minimize the motion and apply post processing techniques. Some systems attempt to predict motion. However, often such previous imaging systems exhibit enhanced platform vibration coupling and the success of physical motion correction techniques have been limited based on ineffective predicting of semi-chaotic motion with high precision and the frequency of the angular displacement, and/or mechanical systems not being capable of responding fast enough or accurately enough to effectively cancel out the motion or jitter.

In some embodiments, the one or more sensor systems 110 are configured to detect angular jitter noise, movement, tilt, rotation, and/or other such movement relative to the image capture system 108 that may alter and/or cause line of sight angular displacement of the image capture system 108 relative to a target being captured in images by the image capture system. In some embodiments, at least one sensor system 110 is secured with the mounting 106 and/or the image capture system 108. The sensor systems may include one or more gyroscopes, accelerometers, inertial sensors, other such sensor systems, or combination of two or more of such sensor systems. Some embodiments utilize multiple different sensor systems each to detect vibration and/or angular displacement in one of multiple different directions or axes of movement. Some sensor systems may additionally or alternatively be used to detect vibration and/or angular displacement in multiple directions or along multiple axes.

The illumination source system 112, when included in the system, is further positioned relative to the image capture system 108 to emit illumination that is reflected by the remote target (and often surrounding area) being imaged, and subsequently detected by the image capture system. In some embodiments, the illumination source system 112 is cooperated with the mounting 102 in alignment with the line of sight of the image capture system 108. The illumination source system 112 can include one or more laser systems (e.g., infrared, ultraviolet, other such lasers), or other light source.

The image capture control circuit 106 is communicatively coupled with the one or more movement and/or jitter sensor systems 110, the illumination source system 112, and the image capture system 108. Some implementations further comprise one or more mechanical stabilization control circuits 116 coupled with and controlling one or more motors 120 to implement movement of the mounting 102, image capture system 108, illumination source system 112, and/or other structure. The mechanical stabilization control circuit 116 may further be configured to control the one or more motors 120 to control a direction of the field of view of the image capture system 108. In some applications, the mechanical stabilization control circuit communicatively couples with the image capture control circuit 106 to receive instructions from the image capture control circuit, provide information to the image capture control circuit, and/or provide instructions to the image capture control circuit.

The one or more motors 120, when activated, implement movement of the mounting 102 and/or other structure. In some instances, the image capture control circuit 106 is communicatively coupled with one or more motors 120 and/or some or all of the mechanical stabilization control circuit 116 may be implemented through the image capture control circuit 106. Other embodiments are implemented without the one or more motors 120 and/or mechanical stabilization control circuit 116 used in controlling movement of the mounting. Such embodiments, in some applications, control line of sight of the image capture system 108 and/or provide at least some mechanical stabilization through control of one or more motors of the vehicle that control movement of the vehicle. In some embodiments, for example, the imaging system 100 is implemented in an unmanned aerial vehicle, and control of one or more motors driving propellers that provide lift and/or movement for the unmanned vehicle are controlled in part to provide some mechanical pointing of the imaging system and/or stabilization.

The image capture control circuit 106 can activate the image capture system 108 to capture one or more images, and in some instances to capture video content comprising a series of frames. The frame rate at which the image capture system 108 operates can be 24 frames per second, in some instances at least 30 frames per second, and in some instances greater than 30 frames per second. Additionally, one or more other image capture systems 108 may cooperatively operate to capture additional frames. Still further, the image capture control circuit 106 can, in some applications, control the illumination source system 112 based in part on the frame rate. In some embodiments, the image capture control circuit 106 further controls one or both of the image capture system 108 and the illumination source system 112 based on the sensor data received from the one or more sensor systems 110.

The image capture control circuit 106 is configured to receive sensor data from the one or more sensor systems 110, such as line of sight angular displacement data from one or more the jitter sensor systems. Typically, the sensor data is received in substantially real-time. Accordingly, as the sensor data is captured and/or processed, the data and/or processed sensor data is communicated to the image capture control circuit. Further, the sensor data is typically received at the image capture control circuit 106 just prior to and/or during each frame being captured by the image capture system 108.

Figure 2:
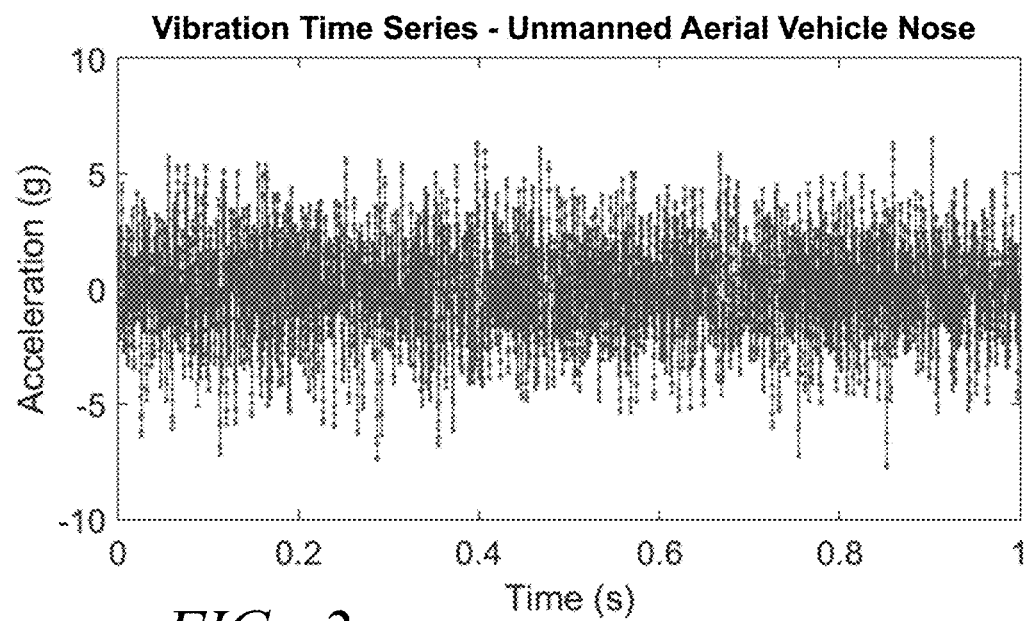
FIG. 2 illustrates a simplified graphical representation of an exemplary vibration profile for a turret system in an unmanned aerial vehicle.
Figure 3:
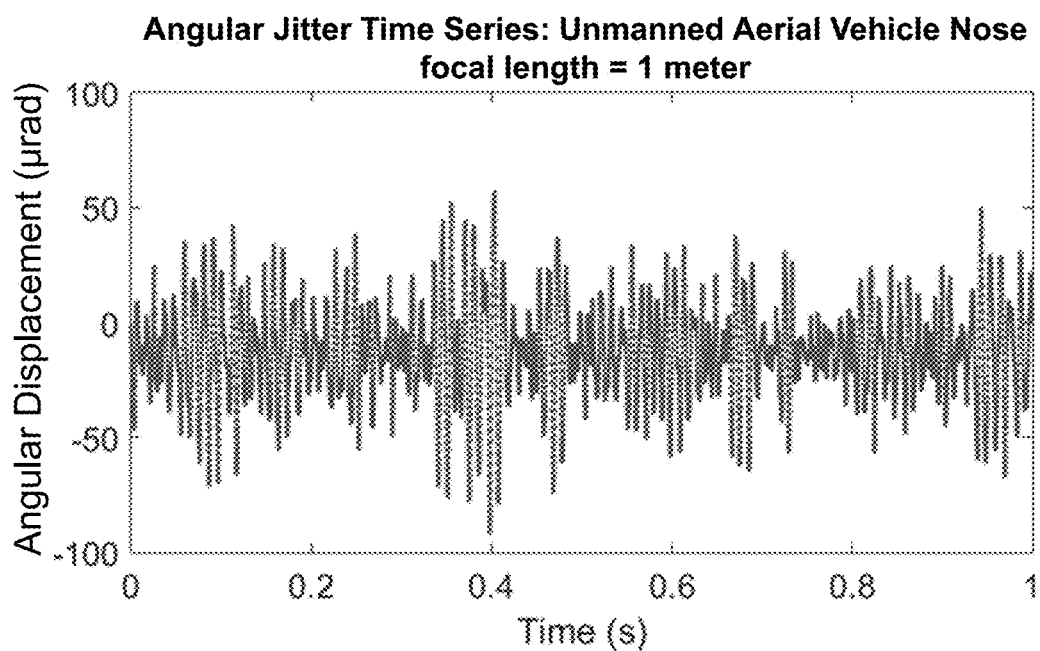
FIG. 3 illustrates a simplified graphical representation of exemplary angular jitter sensor data versus time.
Figure 4:
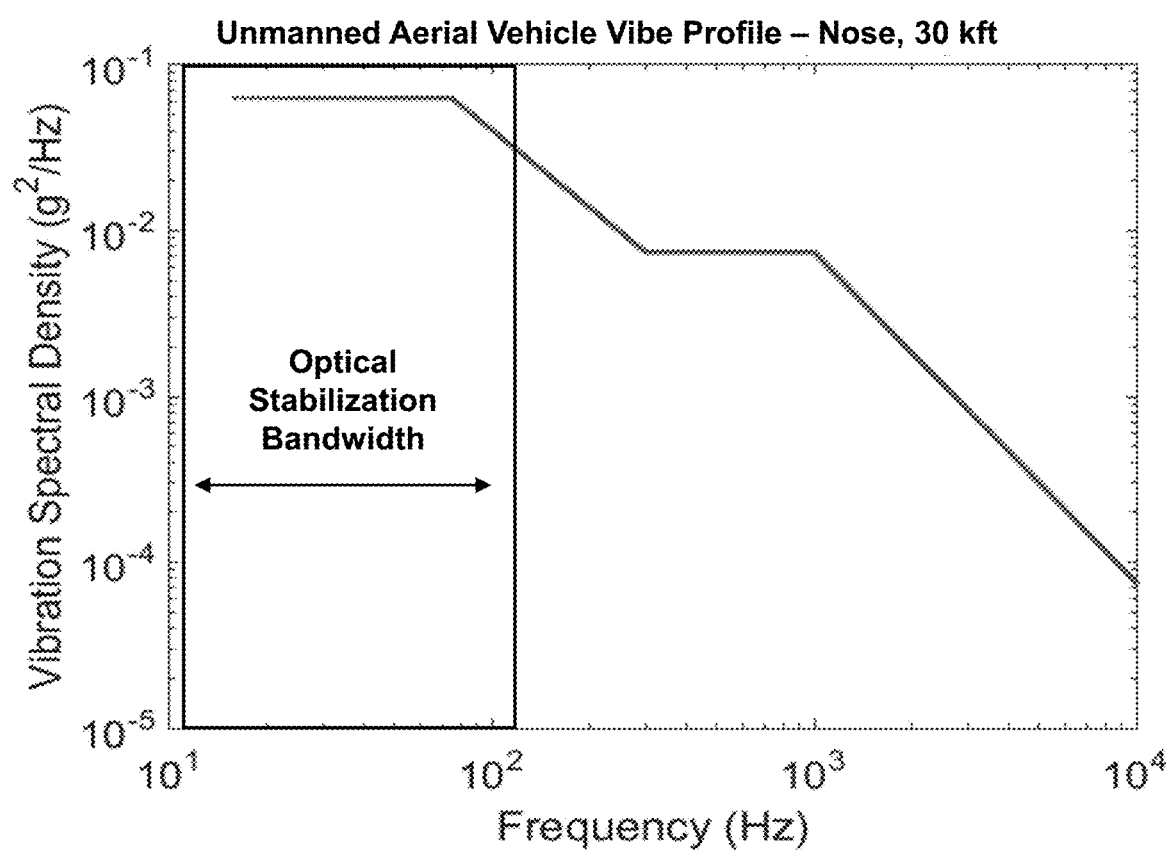
FIG. 4 illustrates a simplified graphical representation of a vibration power spectrum density for an exemplary movable platform, in accordance with some embodiments.

FIG. 2 illustrates a simplified graphical representation of an exemplary vibration profile for a turret system in a vehicle showing vibration sensor data versus time that may affect an image capture system 108 while attempting to capture images as a vehicle, with which the imaging system 100 is cooperated, is moving. The exemplary graphical representation shows acceleration (g) versus time caused by vibrations in a platform (e.g., a small unmanned aerial vehicle (SUAV)). FIG. 3 illustrates a simplified graphical representation of exemplary angular jitter sensor data versus time that may affect an image capture system 108 while attempting to capture images as a vehicle, with which the imaging system 100 is cooperated, is moving (in this example corresponding to about 20-30 microradians of line of sight jitter). As illustrated, the displacement of the image capture system 108 can fluctuate at relatively high frequencies (e.g., greater than 100 Hz, and often greater than 1000 Hz). In some applications, the imaging system 100 may attempt to compensate for some lower frequencies of noise and/or displacement through mechanical stabilization mechanisms (e.g., the motor 120 and mechanical stabilization control circuit 116) and/or image processing. FIG. 4 illustrates a simplified graphical representation of a vibration power spectrum density for an exemplary movable platform (e.g., a small unmanned aerial vehicle (SUAV)), in accordance with some embodiments. The exemplary vibration power spectral density (g²/Hz) is graphically shown versus frequency distribution.

Again, in some embodiments, the imaging system 100 may employ one or more mechanical stabilization techniques in attempts to limit or prevent some of the lower frequency angular displacements caused by lower frequency vibrations. Such mechanical compensations are typically limited to provide compensation for displacement frequencies that are less than about 500 Hz, and often less than 100 Hz. In some embodiments, the image capture control circuit 106 additionally or alternatively applies one or more displacement thresholds relative to angular displacement in controlling exposure of and/or when to expose the image capture system 108 to illumination from the illumination source system 112. Some implementations control exposure relative to angular displacement frequency to aid in limiting image degradation from vibration and jitter that cause angular displacement of the image capture system 108 at the lower frequencies (e.g., below 100 Hz) as well as higher frequencies of vibration and/or jitter.

In some embodiments, the image capture control circuit 106 determines an angular displacement of the image capture system 108. Typically, the image capture control circuit determines the angular displacement just prior to and/or during each capture frame. Further, in some implementations, the image capture control circuit continuously determines and monitors the angular displacement of the image capture system 108 while images are captured. The angular displacement evaluation can, in some embodiments, be limited based on sensor data corresponding to frequencies greater than a predefined frequency threshold. Further, in some embodiments, the image capture control circuit 106 monitors when the detected angular displacement of the image capture system 108, based on the line of sight angular displacement data from the one or more sensor systems 110, is beyond one or more angular displacement thresholds and in some instances is beyond one or more angular displacement threshold envelopes.

Figure 5:
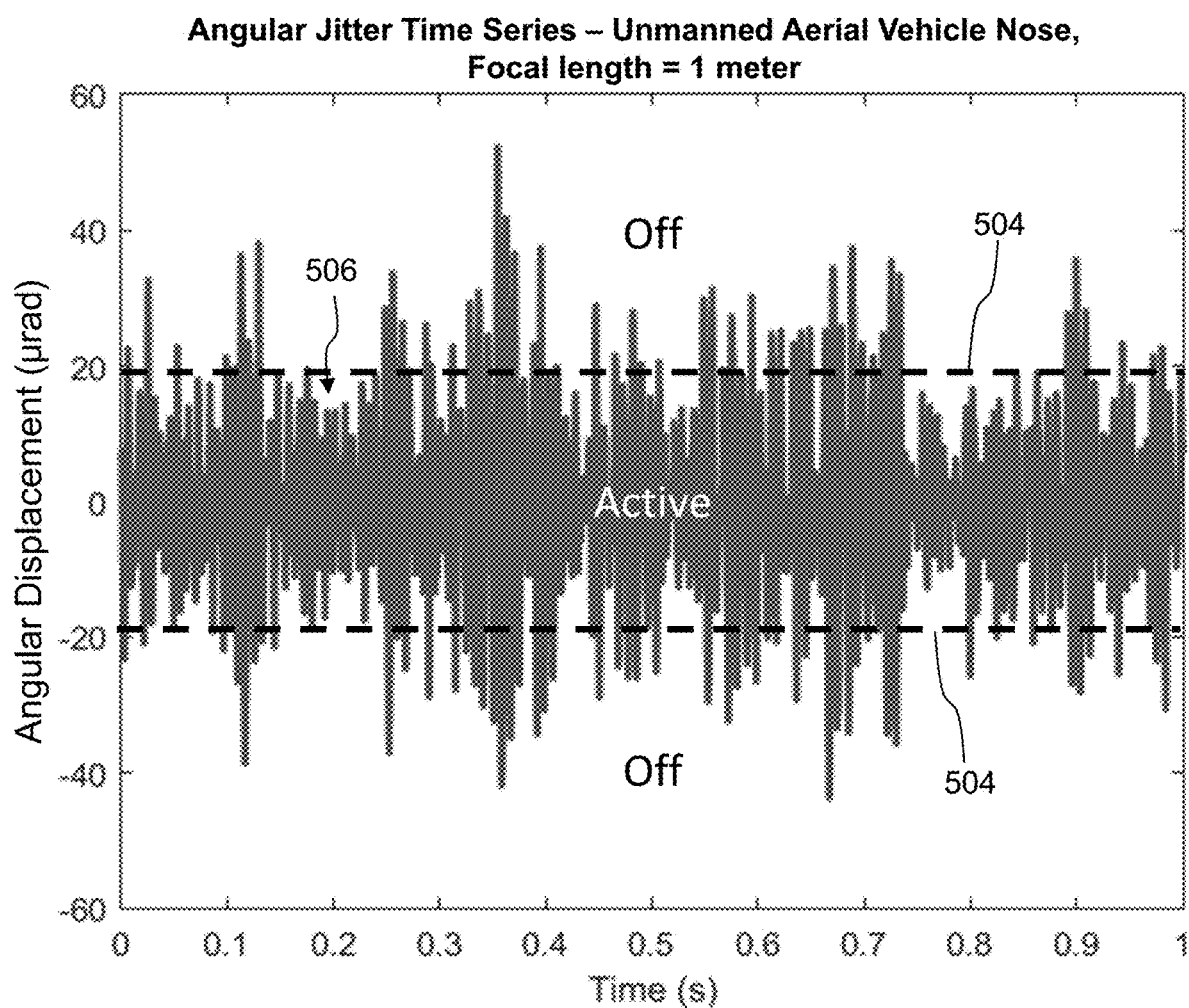
FIG. 5 illustrates a simplified graphical representation of exemplary angular displacement (in microradians) versus time based on sensor data, in accordance with some embodiments.

FIG. 5 illustrates a simplified graphical representation of exemplary angular displacement (in microradians) versus time based on sensor data from one or more sensor systems 110, in accordance with some embodiments. For example, in some implementations one or more gyroscopes provide relatively high bandwidth acceleration data (e.g., in the range of a vibration profile of about 3 kHz or higher). One or more angular displacement thresholds 504 can be defined to be used in controlling exposure of the image capture system 108 to illumination (e.g., a positive or first directional threshold, and a negative or second directional threshold). In some embodiments, an angular displacement threshold envelope 506 is defined between two or more angular displacement thresholds. The boundaries or thresholds 504 of the angular displacement threshold envelope 506 may be equal magnitudes from a zero or may be unequal depending on the angular displacement being detected or estimated, and/or other sensor data being detected. The envelope boundaries and/or thresholds can be dependent on one or more factors such as detected displacement, amplitude and/or frequency of vibration, resulting signal to noise ratios of captured images, and other such factors. As one example, in some implementations, the displacement threshold envelope 506 may be +/−20 microradians. Again, one or more factors may affect the displacement threshold envelope 506.

In some embodiments, for example, the displacement threshold envelope 506 is determined as a function of signal to noise ratio and resolution of one or more previously captured frames. Some embodiments utilize predefined settings based on desired resolutions of images and a stand-off distance to the target and/or the focal point. The predefined settings specify a known quantity or threshold of jitter or angular displacement that is acceptable to acquire the desired image quality and/or resolution. Accordingly, the displacement threshold envelope 506 can be set based on one or more of the predefined settings. The predefined setting of the displacement threshold envelope 506 can further be modified based on one or more factors, such as the signal to noise ratio of images captured for a set displacement threshold envelope 506 (e.g., too low of a signal to noise ratio can result in an increase of the displacement threshold envelope), accumulated integration time, and/or other such factors. In many applications, the greater the displacement threshold envelope 506 the less integration time is needed. Some embodiments define the displacement threshold envelope 506 as a function of estimated allowable angular displacement relative to an integration time.

Figure 6:
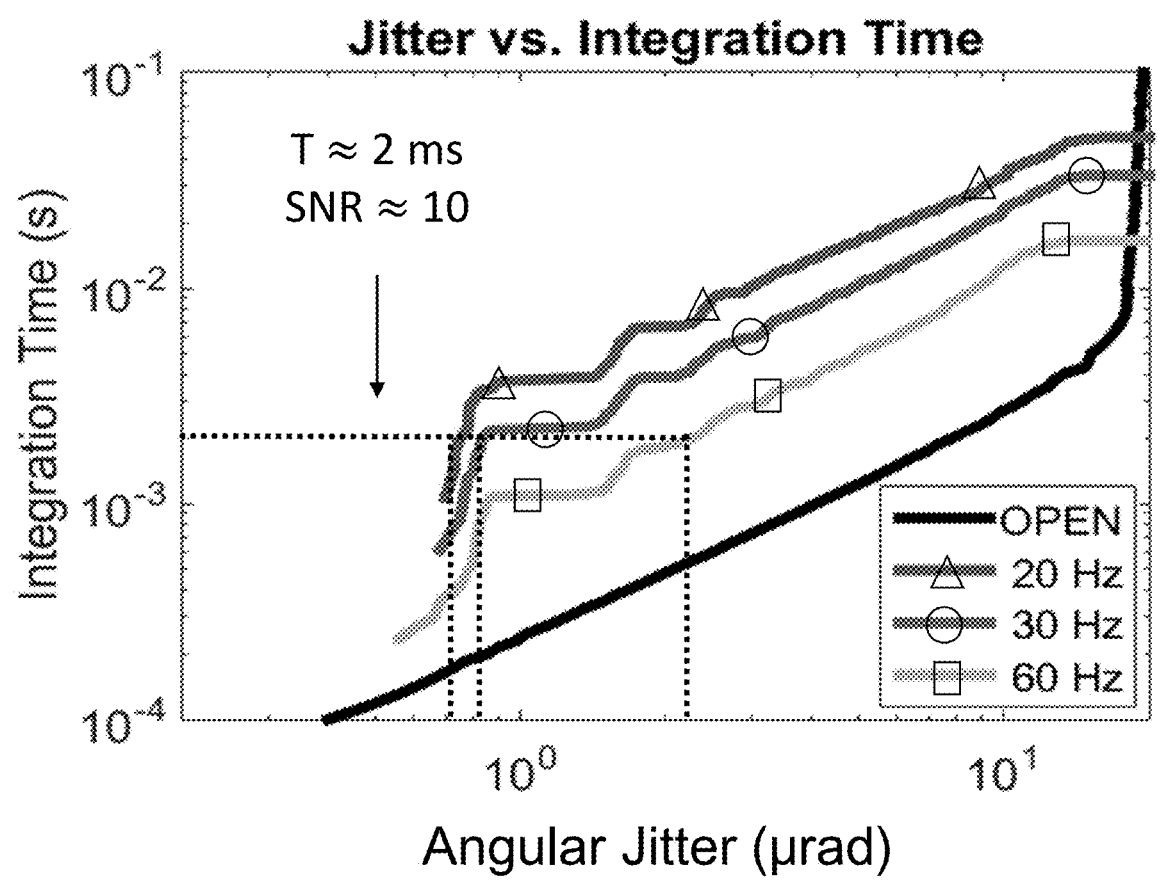
FIG. 6 illustrates a simplified graphical representation of a set of exemplary integration times versus angular jitter relative to different displacement threshold envelopes, in accordance with some embodiments.

FIG. 6 illustrates a simplified graphical representation of a set of exemplary integration times (in seconds) versus angular jitter (in microradians) relative to different displacement threshold envelopes, in accordance with some embodiments. By varying the displacement threshold envelope the integration time is correspondingly varied, which similarly varies the amount of jitter affecting the image capture system 108 while capturing a frame. Some embodiments identify a threshold acceptable jitter to achieve a desired signal to noise ratio, which can be used to identify a corresponding integration time. Further, in some instances, the detected jitter and/or angular displacement measured over time can be used to predict continued expected jitter, which can then be used to determine integration times and thus the displacement threshold envelope 506 per frame rate. The illumination source system 112 and/or the image capture system 108 can be strobed in accordance with the displacement envelope to capture the frames while at least mitigating the angular displacement.

During one or more, and typically each frame being captured, the image capture control circuit 106 monitors when the detected angular displacement of the image capture system, based on the line of sight angular displacement data, is beyond the angular displacement threshold envelope 506. The effect of the angular displacement beyond this displacement threshold envelope can result in a degradation of image quality and/or resolution that is beyond a desired result. Accordingly, the image capture control circuit 106 can control the exposure of the image capture system to illumination based on the real-time detected angular displacement relative to the angular displacement threshold envelope 506. The control of exposure to illumination may control exposure to illumination from the illumination source system 112, an illumination source external to the imaging system 100, ambient illumination, and/or other such sources of illumination. In some embodiments, the image capture control circuit 106 continuously monitors the sensor data during the capturing of each frame to detect when the angular displacement of the image capture system is beyond one or more of the displacement threshold envelopes 506 and/or one or more of the displacement thresholds 504.

Based on the monitored sensor data and/or angular displacement, the image capture control circuit 106 activates exposure of the image capture system 108 to illumination, during the capture frame, when the detected angular displacement of the image capture system 108 is within the angular displacement threshold envelope 506. Further, during each frame being captured, the image capture control circuit controls a level of exposure of the imaging system to decrease or inhibit exposure of the image capture system 108 to illumination, during the capture frame, when the detected angular displacement is not within the angular displacement threshold envelope 506. Accordingly, in some instances when the angular jitter and thus the angular displacement of the image capture system fluctuates sufficiently during a frame, the image capture control circuit repeatedly adjusts a level of exposure of the image capture system during the single frame as a function of the fluctuation of the detected angular displacement during that frame. Some embodiments the image capture control circuit in controlling the level of exposure repeatedly activates and inhibits the image capture system 108 from exposure of the illumination during a single frame. This repeated enabling and inhibiting during a single frame establishes multiple sub-integration periods of the capture frame. The sum integration of these sub-integration periods and/or decreased exposure during a single frame period produces a single image capture frame along the intended line of sight (i.e., of the target). By limiting when the image capture system 108 is exposed and/or limits the level or how much exposure to the illumination, the effective jitter relative to active image capturing can be significantly reduced. In some applications, the imaging system 100 reduces the effective angular displacement from the vibration or jitter (e.g., the 20-30 microradians from the examples above) to less than 10 microradians, and often less than 5 microradians. Some embodiments control the threshold envelope to achieve a resulting angular displacement of less than 2 microradians enabling the image capture system 108 to capture an image with a desired image resolution (e.g., to accurately perform facial recognition of a target 30,000 ft. distance from the imaging system 100) and reducing or eliminating the degradation that would otherwise be caused in the image by such angular displacement as a result of such vibrations.

In some embodiments, when the angular jitter and thus the angular displacement of the image capture system fluctuates relative to one or more threshold envelopes during a frame, the image capture control circuit 106 repeatedly decreases and increases levels of exposure of the image capture system 108 to illumination from the target during a single frame. By smoothing decreasing and increasing how much the image capture system 108 is exposed to the illumination and/or limiting when the image capture system 108 is exposed, the effective jitter relative to active image capturing can be significantly reduced.

Some embodiments control the illumination source system 112 in controlling exposure. In some embodiments, the image capture control circuit 106, in activating the exposure of the image capture system 108 to the illumination from the illumination source system 112 activates, during the capture frame, the illumination source system 112 along the line of sight and/or such that the illumination impinges upon the focal point of the image capture system when the detected angular displacement of the image capture system is within the angular displacement threshold envelope 506. The activation of the illumination source system 112, in some implementations, causes the illumination source system to emit illumination along the line of sight. Further, the image capture control circuit deactivates the illumination source system, during the capture frame, when the detected angular displacement is not within the angular displacement threshold envelope 506. Additionally or alternatively, in some embodiments, the image capture control circuit gradually decreases the intensity of the illumination or illuminator strength from the illumination source as the detected angular displacement increases toward and/or beyond one or more angular displacement thresholds 504 and/or threshold envelopes 506, and similarly gradually increases the intensity of the illumination or illuminator strength as the detected angular displacement decreases relative to and/or is within one or more angular displacement thresholds 504 and/or threshold envelopes 506. The gradual increased and decreased exposure may be implemented in an analog fashion, in a binary to multiple thresholds fashion, or other such gradual change in levels of exposure. The rate of increase or decrease may be a function of the detected displacement, a rate of change of detected displacement and/or other such factors. Typically, the rate factor or the applied rate of change of exposure, when applying a non-binary or analog adjustment, is dependent on the detected angular displacement. Again, some embodiments merely prevent exposure (e.g., by controlling an illumination source and/or the image capture system), while other embodiments provide an analog adjustment of the exposure level based on detected angular displacement. Such embodiments that apply an analog adjustment may smoothly or through steps adjust the level of exposure (e.g., decrease smoothly (analog) as the angular displacement from center increases). For example, the rate of increase or decrease is proportional to the amount of displacement from a zero displacement or other threshold. In some applications, the rate of decrease and increase may be applied symmetrically, while in other embodiments, the rate of increase may similarly be dependent on the detected level of angular displacement relative to one or more thresholds. Further, in some instances the smooth rate of change may reach a threshold that results in exposure being prevented for a period of time, and as displacement decreases the level of exposure can be gradually increased.

In some implementations, the image capture control circuit 106 activates the illumination source system 112 to generate illumination, and deactivates the illumination source system to stop generating illumination based on the detected sensor data and the angular displacement relative to the displacement threshold envelope 506. Accordingly, in some embodiments, the image capture control circuit 106 activates and deactivates the illumination source system 112 multiple times per frame achieving the sub-integration periods. Additionally or alternatively, some embodiments control one or more optics 124, 125 (e.g., one or more lenses, mirrors, filters, prisms, etc.) of the illumination source system 112 and/or the imaging system 100 to control when illumination being emitted by the illumination source system 112 is directed along the line of sight and when the illumination is prevented from continuing along the line of sight. Further, some embodiments control, during each frame, an amount or intensity level of illumination that is directed along the line of sight as a function of the changing detected angular displacement relative to one or more threshold envelopes over each respective frame being captured. Some applications providing an analog implementation continuously considering new exposure strengths relative to each displacement location.

For example, in some instances, the illumination source system 112 may comprise a shutter laser that has a laser rise time of about 1 microsecond. Based on the distance of travel of the illumination (e.g., a resulting round trip light travel time of about 6 microseconds from a plane flying at about 30,000 feet to a remote location or target and back). Accordingly, the time between activation and detection is minimal relative to the frequency of the angular jitter and/or angular displacement resulting from the jitter, vibration or the like. This allows precise and rapid control over the exposure of the image capture system 108 to the illumination from the one or more illumination source systems. Further, this allows the multiple sub-integration periods during a single frame while still exposing the image capture system 108 to sufficient quantities of light to capture an image with a desired resolution and signal to noise ratio.

Some embodiments additionally or alternatively gradually decrease and increase the level of illumination that the image capture system is exposed to relative to the angular displacement. The image capture control circuit 106 can, in some implementations, control a level of illumination emitted from the illumination source system 112 to increase and decrease the amount of light to which the image capture system is exposed based on the detected sensor data and the angular displacement relative to the one or more displacement threshold envelopes 506 and/or thresholds 504. Accordingly, in some embodiments, the image capture control circuit 106 fluctuates the illumination intensity along the line of sight from illumination source system 112 multiple times per frame. A gradual increase or decrease can be applied dependent on the detected vibration profile of the platform (e.g., Gaussian profiles). Further, in some instances, the image control circuit may activate and deactivate the illumination source system 112 one or more times per frame in addition to gradually decreasing and increasing exposure during one or more of those same frames.

In some embodiments, the image capture control circuit, in activating the exposure of the image capture system to the illumination, is configured to additionally or alternatively activate, during the capture frame, the image capture system to expose image sensors of the image capture system 108 when the detected angular displacement of the image capture system is within the angular displacement threshold envelope, and deactivate, during the capture frame, the image capture system to prevent the imaging sensors from being exposed when the detected angular displacement is not within the angular displacement threshold envelope. Further, in some embodiments, the image capture control circuit may additionally or alternatively control the integration gain of the image capture system 108 based on the detected angular displacement relative to the one or more thresholds and/or angular displacement threshold envelopes. The control of the integration gain may be particularly beneficial when using ambient light and/or when the system is not using or not activating the illumination source system 112. Some embodiments control one or more shutters, filters, mirrors, prisms, integration gain of the imaging system and/or focal plane array, and the like of the image capture system to control the exposure of the image sensors to the illumination. Again, the illumination may be from the one or more illumination source systems 112 of the imaging system 100, external sources, ambient light and/or other such sources of light. As such, in some implementations the image capture control circuit 106 in activating the image capture control system exposes the image sensors to the illumination generated from a source external to the imaging system 100.

By repeatedly activating and inhibiting exposure during a single frame and/or gradually decreasing and increasing illumination exposure and/or integration gain of the imaging system, in some applications, provides a flashing or shuttering to establish the sub-integration periods. The accumulation of detected photons during the multiple sub-integration periods of a frame period is typically less than would otherwise be detected when continuously exposed during an entire frame, assuming other modifications are not implemented. This decrease in photon detection can decrease the signal to noise ratio (SNR) of frames due to decreasing total photon count. Some embodiments, however, attempt to at least partially compensate for the decreased photon count by controlling power levels of the illumination source system and/or emitted illumination. This control can include varying the power level of the one or more illumination source systems 112 over a single capture frame, as well as over multiple frames.

Further, it has been determined that power levels at which some light and/or laser sources operate can result in thermal stresses that can affect the power levels at which the light and/or laser sources can continue to operate and/or durations for which the light and/or laser sources can operate at particular power levels. In some embodiments, the image capture control circuit 106 is further configured to track periods of time that the illumination system is active and emitting illumination, track the power levels at which the illumination source is activated, and/or track periods of time the illumination system is inactivate and not generating illumination. For example, the image capture control circuit tracks the time the image capture control circuit directs the illumination source system 112 to be active. Further, the image capture control circuit 106 can track the power levels at which the illumination source system 112 operates while generating and emitting illumination. The power level may vary over time. In some instances, the power levels are specified by the image capture control circuit. Additionally or alternatively, the image capture control circuit may receive data from the illumination source system 112 specifying power levels at which the illumination source system is operating to emit light and corresponding durations operated at the specified power levels. Other parameters may be communicated by the illumination source system 112 to the image capture control circuit 106, such as but not limited to, temperature of one or more components of the illumination source system, accumulated active time, thresholds, and the like.

Based on periods of time the illumination system is active and the corresponding power levels of the illumination system while active, the image capture control circuit 106 can estimate system limitations, including a thermal stress of the illumination source system, electric field breakdown of circuitry or laser dielectrics from applying too strong of a voltage, and/or other such limitations. Some embodiments further consider one or more other system limitations, factors or parameters such as but not limited to parameters of the specific illumination source of the illumination source system 112, parameters and/or feedback from corresponding cooling systems, one or more thresholds of the illumination source system, and/or other such parameters. In some embodiments, the image capture control circuit 106 further adjusts the operating power levels of the illumination source system while active as a function of the estimated system limitations (e.g., thermal stresses). This adjustment may include adjustments prior to a frame, and in some instances may include multiple power adjustments during a single frame.

Figure 7A:
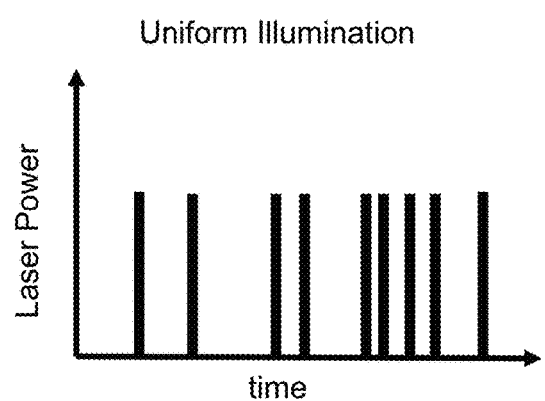
FIG. 7A illustrates a simplified graphical representation of exemplary laser power levels of pulses of lasers versus time.
Figure 7B:
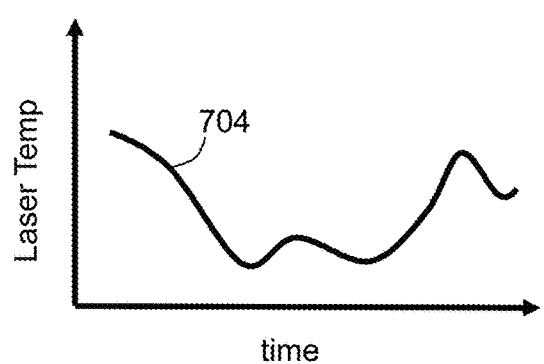
FIG. 7B illustrates a simplified graphical representation of an example temperature of a laser source versus the corresponding time.

FIG. 7A illustrates a simplified graphical representation of exemplary laser power levels of pulses of lasers versus time, with the pulses having a constant power level. The time or duration between pulses corresponds to an example control of the activation of an illumination source system 112 in accordance with the angular displacement of the image capture system 108 being within the displacement threshold envelope 506. FIG. 7B illustrates a simplified graphical representation of an example temperature 704 of a laser source versus the corresponding time of FIG. 7A caused by the generation of the time spaced pulses. As can be seen in these examples, the temperature of the laser source is allowed to drop as the time between pulses is increased, while the temperature increases as the time between pulses is decreased.

In some embodiments, the image capture control circuit 106 and/or a pulse control circuit of the illumination source system adjusts the power levels of different pulses of illumination (e.g., infrared laser) as a function of timing between pulses and/or a temperature of one or more components of the illumination source system 112 (e.g., a laser source). This power level adjustment is used in cooperation with the determination of when the angular displacement of the image capture system 108 is within the angular displacement threshold envelope 506.

Figure 8A:
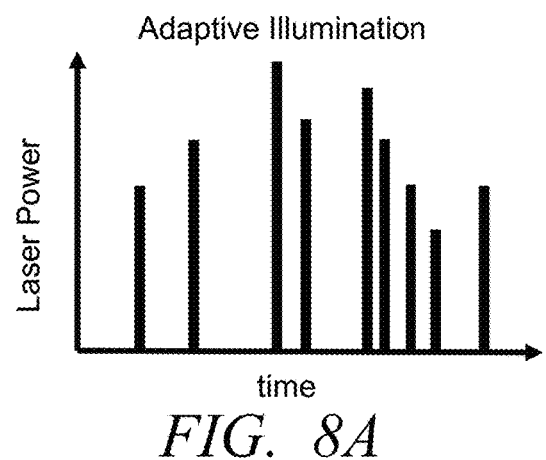
FIG. 8A illustrates a simplified graphical representation of exemplary laser power levels of a set of pulses of lasers versus time having varying power levels, in accordance with some embodiments.
Figure 8B:
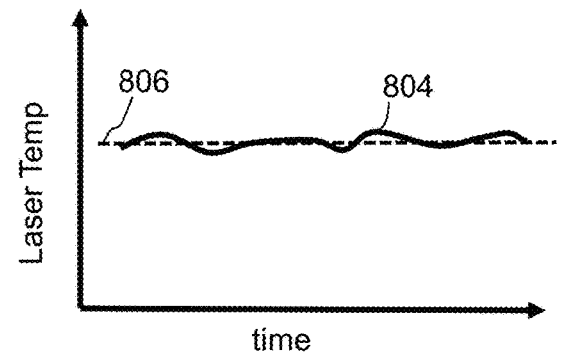
FIG. 8B illustrates a simplified graphical representation of an example temperature of a laser source versus the corresponding time caused by the generation of the time spaced pulses, in accordance with some embodiments.

FIG. 8A illustrates a simplified graphical representation of exemplary laser power levels of a set of pulses of lasers versus time, with the pulses having varying power levels, in accordance with some embodiments. The time or duration between pulses is consistent with the timing between pulses of FIG. 8A. FIG. 8B illustrates a simplified graphical representation of an example temperature 804 of a laser source versus the corresponding time of FIG. 8A caused by the generation of the time spaced pulses, in accordance with some embodiments. By varying the power levels of the different pulses over time, the temperature of the laser source is more constant following a theoretical constant 806. In some embodiments, the image capture control circuit utilizes the time between activation of the illumination source system 112 based on the angular displacement of the image capture system 108 relative to the displacement threshold envelope to cause the power of the output illumination (e.g., laser) to be adjusted over time during a single frame, as well as over a sequence of multiple frames and/or frames of a captured video.

The image capture control circuit can track periods of time that the illumination source system is active and emitting illumination and the power levels of illumination, and estimate a thermal stress of the illumination system as a function of the periods of time the illumination system is active and the corresponding power levels during those active periods. Other system limitations may be considered and/or estimated. The power levels of the illumination source system while active and/or between active periods can be adjusted as a function of the estimated thermal stress, other imitations and/or a temperature of one or more components of the illumination source system. Through the adjustment of the power of the outputted illumination, the signal to noise ratio obtained over the frame from the sub-integration periods of captured frames can be increased over signal to noise ratios obtained when a constant power level is applied providing an improved image resolution. In some embodiments, the signal to noise ratio obtained through the use of the sub-integration periods is sufficient to provide the desired image resolution. In some applications, a signal to noise ratio threshold is at least 8, and often 10 or greater. By applying the varying power levels at the illumination source system 112, the resulting image of each frame can achieve the desired signal to noise threshold while operating the illumination source at sufficient levels to continue to operate over extended periods without over heating or damaging the system. This includes operating the illumination source system 112 while the image capture system 108 is operating at a frame rate of at least 30 frames per second, and in some instances 60 frames per second, 120 frames per second or more, while providing frames having a signal to noise ratio of at least 8, and typically greater than 10.

Some embodiments further take into consideration the optical latency of the illumination source system 112. This can include, for example, taking into consideration the ramping up time of the illumination source system before the illumination is emitted at a desired level (e.g., threshold lumen output), which can depend on the previous power levels and/or durations of operation of pervious activation periods of illumination output. Some embodiments additionally take into consideration the predicted travel time of the illumination from the illumination source system to the target and back to the image capture system 108. Accordingly, the illumination source system 112 may be activated prior to a time the illumination is to impinge on the image capture system 108, which can be based on ramp up time, travel time, other such timing factors, or combination of two or more of such factors. Some embodiments provide a line of sight angular displacement reduction from noise and/or jitter of greater than 10 times with a platform jitter of approximately 25 microradians being reduced to effectively about 1 microradian while still achieving an objective signal to noise ratio of about 10 dB for a representative imaging mission.

In some embodiments, the image capture control circuit, in activating the exposure of the image capture system to the illumination from the illumination source, is configured to additionally or alternatively activate, during the time period of the capture frame, the image capture system 108 to expose the array of image sensors of the image capture system when the detected angular displacement of the image capture system is within the angular displacement threshold envelope 506. Further, the image capture control circuit can deactivate, during the capture frame, the image capture system 108 to prevent the imaging sensors from being exposed when the detected angular displacement is not within the angular displacement threshold envelope 506. This may include activating and deactivating filters, mirrors, lenses, shutters and/or other such optics 124 of the image capture system 108 and/or the imaging system 100. Further, some embodiments gradually adjust the integration gain of the image capture system as a function of the detected angular displacement relative to one or more thresholds and/or threshold envelopes.

In some embodiments, the image capture control circuit additionally or alternatively adjusts the displacement threshold envelope 506 and/or the thresholds 504 of the displacement threshold envelope to in part control illumination exposure of the image capture system 108. In some applications, the image capture control circuit utilizes signal to noise ratio information in determining when and by how much to adjust the displacement threshold envelope, which can result in an increase or decrease in signal to noise ratio. The image capture control circuit, in some embodiments, includes and/or communicates with an image processing system that processes the frames to acquire image quality information, such as full-reference (FR) methods (e.g., signal to noise ratio, peak signal to noise ratio (PSNR), structural similarity (SSIM), visual information fidelity (VIF), etc.), reduced-reference (RR) methods, no-reference (NR) methods (e.g., applying BRISQUE, BLIINDS, DIIVINE, NIQE, or other NR algorithms), and/or other such image evaluations. In some embodiments, the imaging system 100 includes one or more image processing systems 114, which may be part of or external to and communicative coupled with the image capture control circuit 106. The image processing system 114 is configured to process one or more images captured by the image capture system 108 and communicate image resolution data to the image capture control circuit 106. The image capture control circuit utilizes this information to adjust the angular displacement threshold envelope 506 as a function of a resulting resolution and/or a signal to noise ratio corresponding to a preceding frame captured by the image capture system 108.

As introduced above, some embodiments additionally employ mechanical stabilization in attempts to address lower frequency angular displacement (e.g., less than about 100 Hz, and in some instances less than 500 Hz). The imaging system 100 typically includes one or more motors 120 secured with the mounting 102 and/or a portion of the mounting. For example, the mounting may include a turret, gimbal or the like that allows positioning of at least and image capture system 108 and typically a corresponding illumination source system 112. The one or more motor 120 can provide precision movement of the mounting 102 (and/or the image capture system and illumination source system). Some embodiments include a mechanical stabilization control circuit, which may be implemented as part of the image capture control circuit 106 or a separate processing and control system that communicatively coupled with the image capture control circuit. One or more location and/or orientation sensors (which may include the one or more angular jitter sensor systems 110) can provide data to the mechanical stabilization control circuit 116 for use as feedback in positioning and/or maintaining a positioning and line of sight orientation of at least the image capture system 108. In some embodiments, the mechanical stabilization control circuit 116 couples with the one or more motor and the jitter sensor system 110 and/or other sensor systems, which may include sensor systems of the vehicle (e.g., satellite positioning systems, gyroscopes, accelerometers, inertial sensors, compass information, angle sensor systems, pitch sensor systems, tilt sensor systems, and/or other such sensor systems). The stabilization control circuit communications instructions to the motor to control the motor to adjust an orientation of the mounting 102 and/or image capture system 108 relative the vehicle based on the angular displacement data from the jitter sensor system and/or other sensors. The mechanical stabilization in cooperation with the rapid control of the illumination source system 112 and/or image capture system 108 allows the imaging system 100 to mitigate jitter and other noise that can adversely affect a quality and/or resolution of images captured by the imaging system 100.

Some embodiments further consider frequency of atmospheric changes, which can affect the angular displacement of the image capture system 108. As such, some embodiments confirm that the active frame rate is greater than the frequency of atmospheric changes, and in some instances at least twice the frequency of atmospheric changes. In some instances, the frame rate may be increased to address atmospheric changes.

In some embodiments, the imaging system 100 is implemented with reduced components than many previous imaging systems and/or with reduced weight than many previous systems, at least in part, because of the enhanced compensation of vibration and angular displacements through the control of the illumination source system 112 and/or the image capture system 108 in controlling the exposure of the image capture system to the illumination from the illumination source. Further, the captured images provide improved image quality by mitigating effects of angular displacement caused by noise, jitter, vibration and/or other sources at frequencies that are greater than frequencies for which mechanical compensation systems are capable of effectively compensating. The imaging system 100 can be utilized in both active and passive imaging to adaptively improve image resolution, delivering improved tracking, object identification, motion estimation, and facial recognition performance. Additionally, the imaging system 100 is configured for use in extended operation ranges of over 35,000 feet, and for substantially any type of image capture task or mission that needs to acquire images with a threshold quality resolution and that are not signal to noise ratio limited. Accordingly, the imaging system 100 is effective in capturing enhanced resolution imaging at greater standoff distances and/or while the imaging system 100 is positioned into smaller vehicles, including smaller unmanned aerial vehicles. Capturing images from longer ranges and/or when implemented on smaller vehicles is often limited by line of sight jitter of the optical image capture system. Present embodiments, however, reduce or eliminate the effects on imaging from this jitter to provide greater resolution imaging than previously achieved by previous comparable imaging systems, which opens the opportunity for performing new and different image capture missions.

Further, as introduced above, line of sight jitter is at least one of the main limiting factors in high resolution remote sensing from airborne platforms. Previous methods focused on mechanically dampening mechanical vibrations to limit angular displacement during exposure, which is limited by inadequate knowledge and/or sensing of the environment to counteract the vibration motion. The present embodiments, however, do not rely solely on attempting to mechanically counteract the platform motion. Some embodiments adjust integration during times of angular displacement that are beyond a threshold envelope. In some implementations, the adjusted integration is achieved without having to account for the momentum or internal forces of the system and/or platform. The repeated shuttering of the exposure and/or controlling levels of exposure during a single frame of the image capture system 108 to the illumination from the illumination source system 112 provides enhanced resolution images over other previous imaging systems and/or techniques operated from moving vehicles while capturing images at relatively far distances (e.g., greater than 1,000 feet, and often greater than 20,000 feet).

Figure 9:
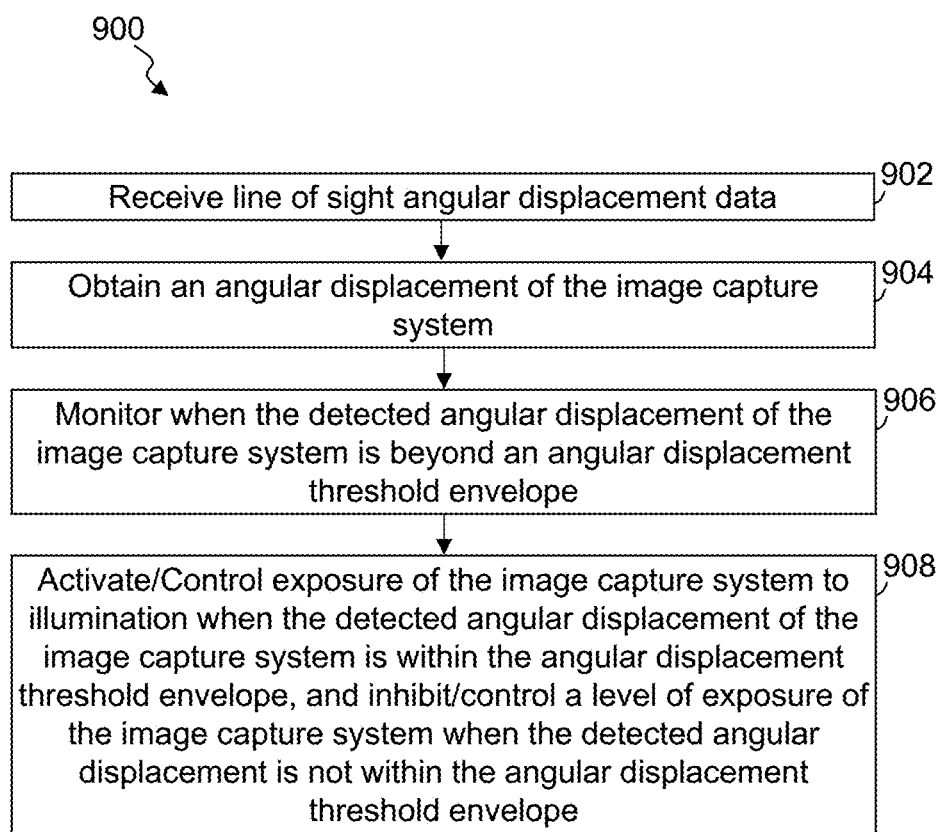
FIG. 9 illustrates a simplified flow diagram of an exemplary process of capturing enhanced resolution images, in accordance with some embodiments

FIG. 9 illustrates a simplified flow diagram of an exemplary process 900 of capturing enhanced resolution images from a moving vehicle, in accordance with some embodiments. In step 902, the image capture control circuit 106 receives, in real-time prior to and while images are being captures, line of sight angular displacement data from the one or more jitter sensor systems 110, which in some implementations are secured with the mounting 102 that is secured with the vehicle. In step 904, an angular displacement of an image capture system is obtained during a capture frame and/or during a frame period of time. As described above, some embodiments continuously obtain and/or determine the angular displacement information of the imaging system 100 and/or the image capture system 108. In some embodiments, the image capture system 108 is secured with the mounting 102.

In step 906, the detected angular displacement is monitored to detect when the angular displacement of the image capture system, based on the line of sight angular displacement data, is beyond one or more thresholds 504, or one or more angular displacement threshold envelopes 506. In step 908, the image capture control circuit controls and/or activates the exposure of the one or more image capture systems 108 to the illumination from the target when the detected angular displacement of the image capture system 108 and/or the imaging system 100 is within the angular displacement threshold envelope 506. The illumination from the target may be ambient illumination, illumination from one or more illumination source system 112, and/or other illumination. Further, in some embodiments, the image capture control circuit 106 inhibits and/or control a level of the exposure of the one or more image capture systems 108 to the illumination from the target (e.g., from one or more illumination source systems 112), during the capture frame, when the detected angular displacement is not within the angular displacement threshold envelope 506, which may establish sub-integration periods of the single frame. The process 900 can be repeated one or more times during each frame period of time for each frame captured. Some embodiments may repeat some or all of the process 900 prior to one or more frames.

The control of and/or activations of the exposure of the image capture system 108 to the illumination from the illumination source system 112, in some implementations, includes activating, during the capture frame, the illumination source system along the line of sight when the detected angular displacement of the image capture system is within the angular displacement threshold envelope 506 to emit illumination along the line of sight. Further, the image capture control circuit in controlling the level of exposure can deactivate the illumination source system, during the same capture frame, when the detected angular displacement is not within the angular displacement threshold envelope 506. In some embodiments, the activation of the exposure of the image capture system 108 to the illumination from the illumination source can include activating, during the capture frame, the image capture system 108 to expose image sensors of the image capture system when the detected angular displacement of the image capture system is within the angular displacement threshold envelope, and deactivating, during the same capture frame, the image capture system 108 to prevent the imaging sensors from being exposed to the illumination from the illumination source system when the detected angular displacement is not within the angular displacement threshold envelope. Typically, the illumination source system 112 and/or the image capture system 108 is activated and deactivated and/or the exposure is increased and decreased multiple times during a single frame period causing the multiple sub-integration periods of the single frame period.

In some implementations, the image capture control circuit, in activating the exposure of the image capture system to the illumination, is configured to activate, during the capture frame, the illumination source system along the line of sight when the detected angular displacement of the image capture system is within the angular displacement threshold envelope to emit illumination along the line of sight. Further, the image capture control circuit in controlling the level of exposure is configured to adjust an integration gain of the image capture system during the capture frame when the detected angular displacement is not within the angular displacement threshold envelope.

Some embodiments track periods of time that the illumination source system 112 is active and emitting illumination (which may include ramp up and/or ramp down periods). A thermal stress of the illumination system is estimated as a function of the periods of time the illumination system is active. As described above, the thermal stress and/or other stresses may be dependent on the duration and/or power level at which the illumination source system is activated, and is dependent on the particular operation parameters of the illumination source system utilized. Other system limitations may be considered in determining power levels. The power levels of the illumination source system can be adjusted between pulses while active as a function of the estimated thermal stress and/or other system limitations.

In some embodiments, the image capture system 108 is operated at a frame rate of at least 30 frames per second, and through the repeated activation and deactivation control of the exposure based on the angular displacement relative to the angular displacement threshold envelope 506 during a single frame at that frame rate, provides frames having a signal to noise ratio of at least 10. Some embodiments adjust the angular displacement threshold envelope 506 to control illumination exposure of the image capture system. Again, the images and/or sensor data from the image sensors of the image capture system can be evaluated to determine whether a resolution and/or signal to noise ratio is at or exceeds predefined set thresholds, and implements adjustments to the displacement threshold envelope accordingly.

As described above, some embodiments provide image processing during and/or after image capture. In some instances, the image processing improves image quality and/or addresses some aspects of the image (e.g., shadowing, artifacts, filtering, affine transformation, pixilation, and/or other such processing). Further, some embodiments, perform processing of images captured by the image capture system to determine image resolution data, clarity, signal to noise ratio, and/or other such processing data. The image data, such as the image resolution data, can be communicated to the image capture control circuit 106 and/or other processing system. Some embodiments adjust the angular displacement threshold envelope 506 as a function of a resulting resolution and a signal to noise ratio corresponding to a preceding frame captured by the image capture system.

In some implementations, the image capture control circuit 106, in activating the exposure of the image capture system to the illumination from the illumination source system, activates and deactivates the illumination source system 112 multiple times per frame achieving the sub-integration periods. Some embodiments additionally utilize the mechanical stabilization control circuit 116 to control one or more motors 120 secured with the mounting 102 and/or other such systems to causes adjusts to an orientation of the image capture system 108, the illumination source system 112 and/or the mounting relative the vehicle based on the angular displacement data from the one or more jitter sensor systems 110.

Figure 10:
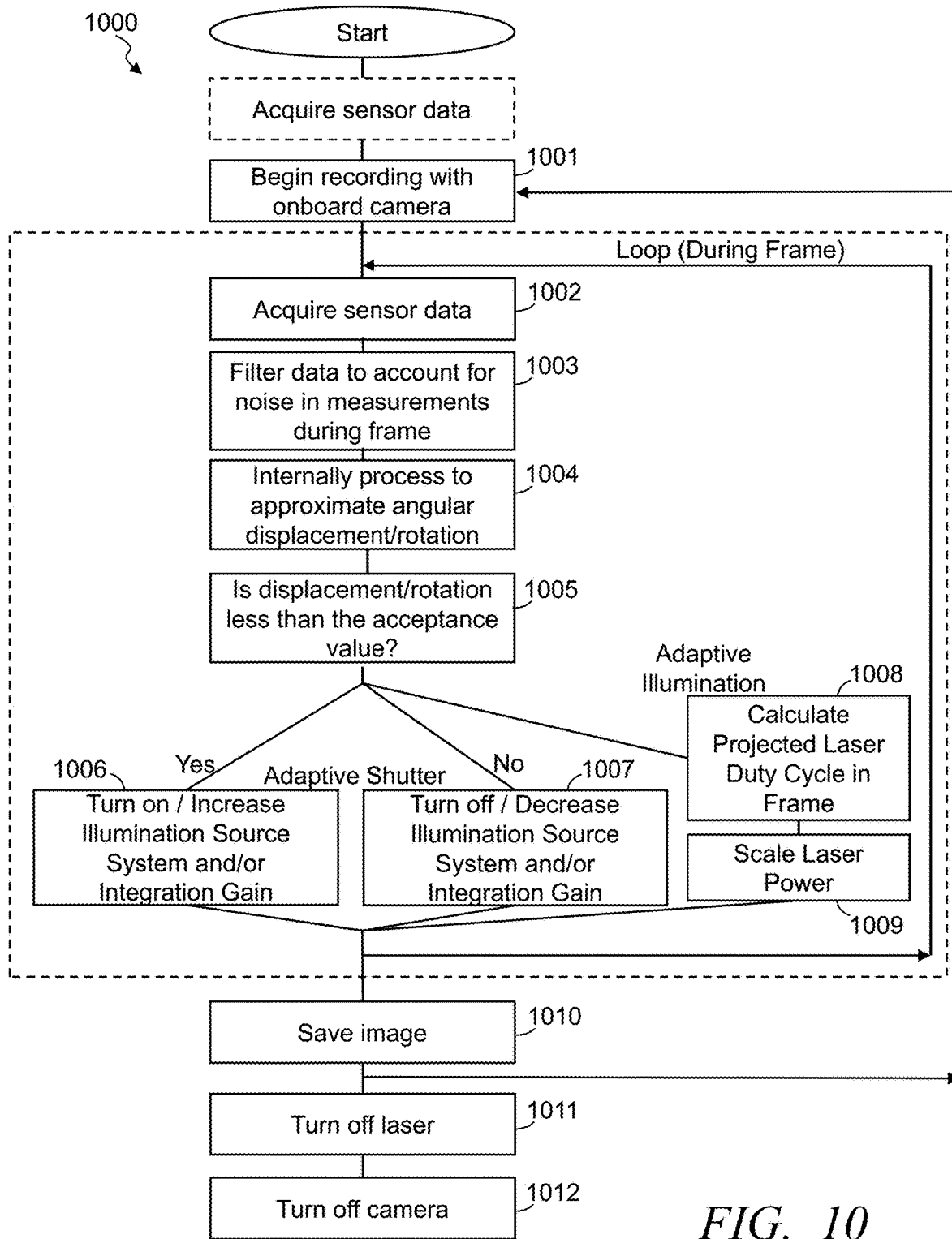
FIG. 10 illustrates a simplified flow diagram of a process of capturing images using the imaging system, in accordance with some embodiments.

FIG. 10 illustrates a simplified flow diagram of a process 1000 of capturing images using the imaging system 100, in accordance with some embodiments. In step 1001, the image capture system 108 is activated to begin capturing a frame. Some embodiments receive sensor data from one or more sensor systems 110 and the sensor data is evaluated to determine whether to and when to activate the image capture system, such as activating when the determined angular displacement of the image capture system is within the displacement threshold envelope. Additionally or alternatively, this sensor data may be acquired during a previous frame being captured. In step 1002, the sensor data (e.g., inertial sensor data, acceleration data, gyroscope data, tilt sensor data, pitch sensor data, yaw sensor data, etc.) is received from the one or more jitter sensor systems 110.

Some embodiments include step 1003 where the sensor data is filters and/or otherwise processed. For example, some of the sensor data may be filters to account for noise in measurements during the frame being captured. In step 1004, the angular displacement and/or angular rotation is approximated and/or determined. The sensors, for example, can provide the angular rate of change, and/or the acceleration along one or more axes (X, Y, Z axes). When using angular rate of change, some embodiments for example integrate the angular velocity in time to obtain angular displacement. When using the one or more accelerations, a lever arm is approximated and integrated twice to transform acceleration to displacement. In step 1005, it is determined whether the angular displacement and/or rotation is within the displacement threshold envelope 506.

When the rotational and/or angular displacement is within the one or more thresholds and/or displacement threshold envelope, the process 1000 advances to step 1006 where the illumination source system 112 and/or the image capture system 108 are activated to expose the imaging sensors of the image capture system to the illumination from the illumination source system and/or controlled to increase exposure of the image capture system to illumination from the target. Alternatively, when the rotational and/or angular displacement is not within the one or more thresholds and/or displacement threshold envelope the illumination source system 112 and/or the image capture system 108 are deactivated in step 1007 to prevent the imaging sensors of the image capture system from exposure to the illumination from the illumination source system and/or controlled to decrease the exposure of the image capture system to illumination from the target (e.g., reduce illumination power, decrease integration gain, etc.). Further, in some embodiments and/or during some implementations, the process implements step 1008 where the image capture control circuit 106 evaluates the operation of the illumination source system and calculates a projected laser duty cycle of one or more pulses during the frame. Such evaluation can be performed through one or more statistical processes (e.g., applying Bayesian statistics to calculate the probability of future angular locations based on the given current angular location and rate of change, and approximating the fraction of time/duty-cycle by the sum of probabilities within the area of interest). In step 1009, the laser power of the illumination source system 112 is adjusted when relevant to provide a desired signal to noise ratio of the image being captured during the frame period while maintaining the illumination source system 112 within heat and other operations thresholds.

During a single frame period of time, steps 1001-1009 may be repeated any number of times. Typically, the steps 1001-1009 are repeated multiple times during a single frame providing the sub-integration periods where the image sensors of the image capture system 108 are intermittently exposed to the illumination from the illumination source system 112 based on the determined angular displacement.

In step 1022, the image and/or the image data for that frame are saved. In some embodiments, in steps 1011 and 1012, the illumination source system (e.g., laser) and/or the image capture system 108 are powered down and/or the illumination is prevented from being directed at the target. In other instances, however, a subsequent frame is initiated and the process 1000 returns to step 1001 to begin capturing a subsequent image for a subsequent frame.

Figure 11:
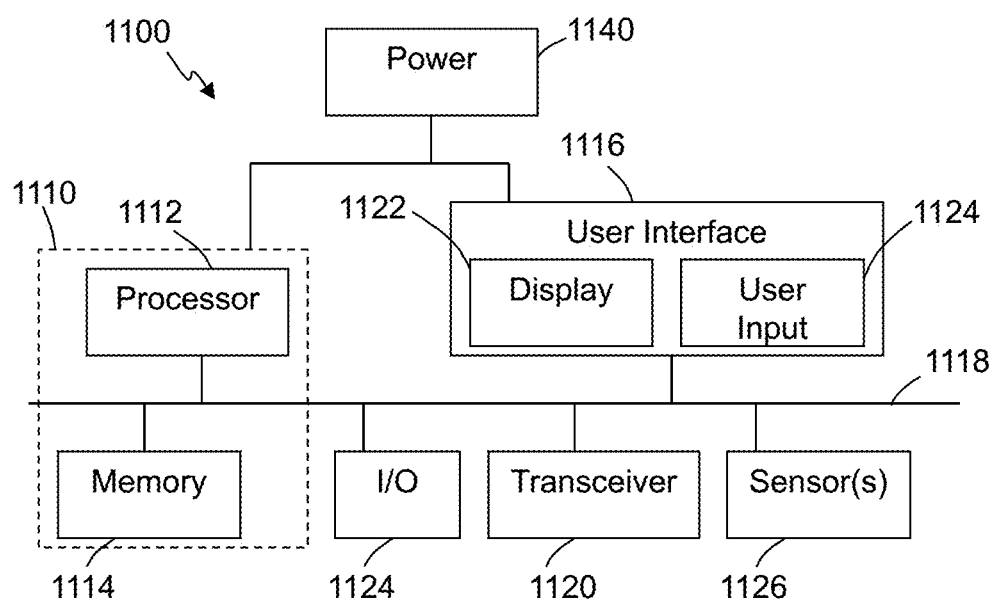
FIG. 11 illustrates an exemplary system for use in implementing methods, processes, techniques, circuits, systems devices and the like in capturing enhanced resolution images while overcoming angular displacement in accordance with some embodiments.

The processes, methods, techniques, circuits, systems, devices, services, and the like described herein may be utilized, implemented and/or run on many different types of devices and/or systems. Referring to FIG. 11, there is illustrated a system 1100 that may be used for any such implementations, in accordance with some embodiments. One or more components of the system 1100 may be used for implementing any system, circuit, apparatus or device mentioned above or below, or parts of such systems, circuits, apparatuses or devices, such as for example any of the above or below mentioned image capture control circuit 106, image capture system 108 and/or control circuit of the image capture system, the illumination source system 112, the sensor systems 110, the mechanical stabilization control circuit 116, and the like. However, the use of the system 1100 or any portion thereof is certainly not required.

By way of example, the system 1100 may comprise a controller or processor module 1112, memory 1114, a user interface 1116, and one or more communication links, paths, buses or the like 1118. A power source or supply 1140 is included or coupled with the system 1100. The controller 1112 can be implemented through one or more processors, microprocessors, central processing unit, logic, local digital storage, firmware and/or other control hardware and/or software, and may be used to execute or assist in executing the steps of the processes, methods and techniques described herein, and control various communications, programs, content, listings, services, interfaces, etc. Further, in some embodiments, the controller 1112 can be part of a control system 1110 and/or implemented through one or more processors with access to one or more memory 1114. The user interface 1116 can allow a user to interact with the system 1100, receive information through the system, view captured images, and the like. In some instances, the user interface 1116 includes a display 1122 and/or one or more user inputs 1124, such as a remote control, keyboard, mouse, track ball, game controller, buttons, touch screen, etc., which can be part of or wired or wirelessly coupled with the system 1100.

Typically, the system 1100 further includes one or more communication interfaces, ports, transceivers 1120 and the like allowing the system 1100 to communication over a communication bus, a distributed network, a local network, the Internet, communication link 1118, other networks or communication channels with other devices and/or other such communications or combinations thereof. Further the transceiver 1120 can be configured for wired, wireless, optical, fiber optical cable or other such communication configurations or combinations of such communications.

The system 1100 comprises an example of a control and/or processor-based system with the controller 1112. Again, the controller 1112 can be implemented through one or more processors, controllers, central processing units, logic, software and the like. Further, in some implementations the controller 1112 may provide multiprocessor functionality.

The memory 1114, which can be accessed by the controller 1112, typically includes one or more processor readable and/or computer readable media accessed by at least the controller 1112, and can include volatile and/or nonvolatile media, such as RAM, ROM, EEPROM, flash memory and/or other memory technology. Further, the memory 1114 is shown as internal to the system 1110; however, the memory 1114 can be internal, external or a combination of internal and external memory. Similarly, some or all of the memory 1114 can be internal, external or a combination of internal and external memory of the controller 1112. The external memory can be substantially any relevant memory such as, but not limited to, one or more of flash memory secure digital (SD) card, universal serial bus (USB) stick or drive, other memory cards, hard drive and other such memory or combinations of such memory. The memory 1114 can store code, software, executables, scripts, data, programming, programs, textual content, identifiers, log or history data, user information, content, images, parameters, and the like.

One or more of the embodiments, methods, processes, approaches, and/or techniques described above or below may be implemented in one or more computer programs executable by a processor-based system. By way of example, such a processor based system may comprise the processor based system 1100, a computer, microcomputer, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing embodiments of the above or below described steps, processes or techniques to capture images. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps described above or below.

Some embodiments provide an enhance resolution imaging system mounted on a moving platform, comprising: a mounting configured to secure with a body of a platform; an electro-optical image capture system cooperated with the mounting; an angular jitter sensor system secured with the mounting configured to detect angular jitter noise causing line of sight angular displacement of the image capture system; an illumination source system cooperated with the mounting; and an image capture control circuit communicatively coupled with the jitter sensor system, the illumination source system and the image capture system, wherein the image capture control circuit, during each image capture frame, is configured to: receive, in real-time, LOS angular displacement data from the jitter sensor system; obtain, during the capture frame, an angular displacement of the image capture system and monitor when the detected angular displacement of the image capture system, based on the LOS angular displacement data, is beyond an angular displacement threshold envelope; and activate exposure of the image capture system to illumination, during the capture frame, when the detected angular displacement of the image capture system is within the angular displacement threshold envelope, and inhibit exposure of the image capture system to illumination, during the capture frame, when the detected angular displacement is not within the angular displacement threshold envelope establishing multiple sub-integration periods of the capture frame.

Further, some embodiments provide methods of capturing enhanced resolution images from a moving platform, comprising: by an image capture control circuit: receiving, in real-time, line of sight (LOS) angular displacement data from a jitter sensor system secured with a mounting secured with a platform; obtaining, during a capture frame, an angular displacement of an electro-optical image capture system secured with the mounting; monitoring when the detected angular displacement of the image capture system, based on the LOS angular displacement data, is beyond an angular displacement threshold envelope; and activating exposure of the image capture system to illumination, during the capture frame, when the detected angular displacement of the image capture system is within the angular displacement threshold envelope, and inhibiting exposure of the image capture system, during the capture frame, when the detected angular displacement is not within the angular displacement threshold envelope establishing multiple sub-integration periods of the capture frame.

While the invention herein disclosed has been described by means of specific embodiments, examples and applications thereof, numerous modifications and variations could be made thereto by those skilled in the art without departing from the scope of the invention set forth in the claims.

What is claimed is:

1. An enhanced resolution imaging system mounted on a moving platform, comprising:
    a mounting configured to secure with a body of a platform;
    an electro-optical image capture system cooperated with the mounting;
    a first jitter compensation system to implement a first technique of angular displacement mitigation to mitigate an effect of line of sight (LOS) angular displacement of the image capture system, comprising:
    an angular jitter sensor system coupled to the mounting and configured to detect angular jitter noise causing line of sight (LOS) angular displacement of the image capture system;
    an illumination source system cooperated with the mounting; and
    an image capture control circuit communicatively coupled with the jitter sensor system, the illumination source system and the image capture system, wherein the image capture control circuit, during each image capture frame, is configured to:
    receive, in real-time, sensor data from the jitter sensor system;
    obtain, during the capture frame, an angular displacement of the image capture system and monitor when the detected angular displacement of the image capture system, based on the sensor data, is within an angular displacement threshold envelope; and
    activate exposure of the image capture system to illumination, multiple times during the capture frame, when the detected angular displacement of the image capture system is within the angular displacement threshold envelope, and control a level of exposure to at least decrease the exposure of the image capture system to illumination during the capture frame when the detected angular displacement is not within the angular displacement threshold envelope; and a second jitter compensation system configured to implement a second technique of angular displacement mitigation to mitigate the effect of the LOS angular displacement of the image capture system, wherein the second technique is different than the first technique, and wherein the second jitter compensation system is configured to operate in cooperation with the first jitter compensation system;

wherein the image capture control circuit in activating the exposure of the image capture system to the illumination is configured to activate and deactivate the exposure of the image capture system multiple times per frame establishing multiple sub-integration periods of the capture frame.

2. The system of claim 1, wherein the image capture control circuit, in activating the exposure of the image capture system to the illumination, is configured to activate, during the capture frame, the illumination source system along the line of sight when the detected angular displacement of the image capture system is within the angular displacement threshold envelope to emit illumination along the line of sight; and wherein the image capture control circuit in controlling the level of exposure is configured to adjust an integration gain of the image capture system during the capture frame when the detected angular displacement is not within the angular displacement threshold envelope.

3. The system of claim 1, wherein the image capture control circuit, in activating the exposure of the image capture system to the illumination, is configured to activate, during the capture frame, the illumination source system when the detected angular displacement of the image capture system is within the angular displacement threshold envelope to emit illumination; and wherein the image capture control circuit in controlling the level of exposure is configured to deactivate the illumination source system, during the capture frame, when the detected angular displacement is not within the angular displacement threshold envelope.

4. The system of claim 1, wherein the image capture control circuit, in activating the exposure of the image capture system multiple times during the capture frame, exposes image sensors of the image capture system when the detected angular displacement of the image capture system is within the angular displacement threshold envelope, and in the deactivating the image capture system comprises preventing the imaging sensors from being exposed when the detected angular displacement during the capture frame is not within the angular displacement threshold envelope.

5. The system of claim 1, wherein the image capture control circuit is configured to adjust the angular displacement threshold envelope to control illumination exposure of the image capture system.

6. The system of claim 1 wherein the image capture control circuit, in activating the exposure of the image capture system to the illumination, applies varying power levels at the illumination source system during two or more different sub-integration periods of the multiple sub-integration periods providing an image having a threshold signal to noise ratio.

7. The system of claim 1, wherein the second jitter compensation system comprises:

at least one motor secured with the mounting; and a mechanical stabilization control circuit coupled with the motor and the jitter sensor system, wherein the stabilization control circuit is configured to control the motor to adjust an orientation of the mounting relative to the platform based on the sensor data from the jitter sensor system.

8. The system of claim 1, wherein the image capture control circuit in activating the exposure of the image capture system is configured to adjust over time the level of exposure of the image capture system to illumination during one or more of the multiple sub-integration periods of the capture frame.

9. An enhanced resolution imaging system mounted on a moving platform, comprising:

a mounting configured to secure with a body of a platform;

an electro-optical image capture system cooperated with the mounting;

a first jitter compensation system to implement a first technique of angular displacement mitigation to mitigate an effect of line of sight (LOS) angular displacement of the image capture system, comprising:

an angular jitter sensor system coupled to the mounting and configured to detect angular jitter noise causing line of sight (LOS) angular displacement of the image capture system;

an illumination source system cooperated with the mounting; and an image capture control circuit communicatively coupled with the jitter sensor system, the illumination source system and the image capture system, wherein the image capture control circuit, during each image capture frame, is configured to:

receive, in real-time, sensor data from the jitter sensor system;

obtain, during the capture frame, an angular displacement of the image capture system and monitor when the detected angular displacement of the image capture system, based on the sensor data, is within an angular displacement threshold envelope; and activate exposure of the image capture system to illumination, multiple times during the capture frame, when the detected angular displacement of the image capture system is within the angular displacement threshold envelope, and control a level of exposure to at least decrease the exposure of the image capture system to illumination during the capture frame when the detected angular displacement is not within the angular displacement threshold envelope; and a second jitter compensation system configured to implement a second technique of angular displacement mitigation to mitigate the effect of the LOS angular displacement of the image capture system, wherein the second technique is different than the first technique, and wherein the second jitter compensation system is configured to operate in cooperation with the first jitter compensation system;

wherein the image capture control circuit, in activating the exposure of the image capture system to illumination, is configured to activate, during the capture frame, the image capture system to expose image sensors of the image capture system when the detected angular displacement of the image capture system is within the angular displacement threshold envelope; and wherein the image capture control circuit in controlling the level of exposure is configured to deactivate, during the capture frame, the image capture system to prevent the imaging sensors from being exposed when the detected angular displacement is not within the angular displacement threshold envelope.

10. An enhanced resolution imaging system mounted on a moving platform, comprising:
- a mounting configured to secure with a body of a platform;
- an electro-optical image capture system cooperated with the mounting;
- a first jitter compensation system to implement a first technique of angular displacement mitigation to mitigate an effect of line of sight (LOS) angular displacement of the image capture system, comprising:
- an angular jitter sensor system coupled to the mounting and configured to detect angular jitter noise causing line of sight (LOS) angular displacement of the image capture system;
- an illumination source system cooperated with the mounting; and
- an image capture control circuit communicatively coupled with the jitter sensor system, the illumination source system and the image capture system, wherein the image capture control circuit, during each image capture frame, is configured to:
  - receive, in real-time, sensor data from the jitter sensor system;
  - obtain, during the capture frame, an angular displacement of the image capture system and monitor when the detected angular displacement of the image capture system, based on the sensor data, is within an angular displacement threshold envelope; and
  - activate exposure of the image capture system to illumination, multiple times during the capture frame, when the detected angular displacement of the image capture system is within the angular displacement threshold envelope, and control a level of exposure to at least decrease the exposure of the image capture system to illumination during the capture frame when the detected angular displacement is not within the angular displacement threshold envelope; and
- a second jitter compensation system configured to implement a second technique of angular displacement mitigation to mitigate the effect of the LOS angular displacement of the image capture system, wherein the second technique is different than the first technique, and wherein the second jitter compensation system is configured to operate in cooperation with the first jitter compensation system;
- wherein the image capture control circuit is further configured to:
- adjust power levels of the illumination source system while active as a function of estimated system limitations based on periods of time the illumination source system is active.

11. An enhanced resolution imaging system mounted on a moving platform, comprising:
- a mounting configured to secure with a body of a platform;
- an electro-optical image capture system cooperated with the mounting;
- a first jitter compensation system to implement a first technique of angular displacement mitigation to mitigate an effect of line of sight (LOS) angular displacement of the image capture system, comprising:
- an angular jitter sensor system coupled to the mounting and configured to detect angular jitter noise causing line of sight (LOS) angular displacement of the image capture system;
- an illumination source system cooperated with the mounting; and
- an image capture control circuit communicatively coupled with the jitter sensor system, the illumination source system and the image capture system, wherein the image capture control circuit, during each image capture frame, is configured to:
  - receive, in real-time, sensor data from the jitter sensor system;
  - obtain, during the capture frame, an angular displacement of the image capture system and monitor when the detected angular displacement of the image capture system, based on the sensor data, is within an angular displacement threshold envelope; and
  - activate exposure of the image capture system to illumination, multiple times during the capture frame, when the detected angular displacement of the image capture system is within the angular displacement threshold envelope, and control a level of exposure to at least decrease the exposure of the image capture system to illumination during the capture frame when the detected angular displacement is not within the angular displacement threshold envelope; and
- a second jitter compensation system configured to implement a second technique of angular displacement mitigation to mitigate the effect of the LOS angular displacement of the image capture system, wherein the second technique is different than the first technique, and wherein the second jitter compensation system is configured to operate in cooperation with the first jitter compensation system;
- wherein the image capture control circuit is configured to adjust the angular displacement threshold envelope as a function of a resulting resolution and a signal to noise ratio corresponding to a preceding frame captured by the image capture system.

12. A method of capturing enhanced resolution images from a moving platform, comprising:
- activating a first jitter compensation system implementing a first technique of angular displacement mitigation to mitigate an effect of line of sight (LOS) angular displacement of the image capture system, comprising:
  - receiving, in real-time, sensor data from a jitter sensor system coupled to a mounting secured with a platform;
  - obtaining, during a capture frame, an angular displacement of an electro-optical image capture system secured with the mounting;
  - monitoring when the detected angular displacement of the image capture system, based on the sensor data, is within an angular displacement threshold envelope; and
  - activating exposure of the image capture system to illumination, multiple times during the capture frame, when the detected angular displacement of the image capture system is within the angular displacement threshold envelope; and
  - controlling a level of exposure to at least decrease the exposure of the image capture system, during the capture frame, when the detected angular displacement is not within the angular displacement threshold envelope; and
- operating, in cooperation with the first jitter compensation system, a second jitter compensation system implementing a second technique of angular displacement mitigation to mitigate the effect of the LOS angular displacement of the image capture system, wherein the second technique is different than the first technique;

wherein the activating the exposure of the image capture system to the illumination comprises activating and deactivating the exposure of the imaging system multiple times per frame establishing multiple sub-integration periods of the captured frame.

13. The method of claim 12, wherein the activating the exposure of the image capture system to the illumination comprises activating, during the capture frame, the illumination source system along the line of sight when the detected angular displacement of the image capture system is within the angular displacement threshold envelope to emit illumination along the line of sight; and
wherein the controlling the level of exposure comprises adjusting an integration gain of the image capture system during the capture frame when the detected angular displacement is not within the angular displacement threshold envelope.

14. The method of claim 12, wherein the activating the exposure of the image capture system to the illumination from the illumination source system comprises:
activating, during the capture frame, the illumination source system when the detected angular displacement of the image capture system is within the angular displacement threshold envelope to emit illumination; and
wherein the controlling the level of exposure comprises deactivating the illumination source system, during the capture frame, when the detected angular displacement is not within the angular displacement threshold envelope.

15. The method of claim 12,
wherein the activating the exposure of the image capture system to illumination multiple times during the capture frame comprises exposing image sensors of the image capture system when the detected angular displacement of the image capture system is within the angular displacement threshold envelope; and
wherein the deactivating, multiple times during the capture frame, the image capture system comprises preventing the imaging sensors from being exposed when the detected angular displacement during the captured frame is not within the angular displacement threshold envelope.

16. The method of claim 12, further comprising:
adjusting the angular displacement threshold envelope to control illumination exposure of the image capture system.

17. The method of claim 12, wherein the activating the exposure of the image capture system comprises applying varying power levels at the illumination source system during two or more different sub-integration periods of the multiple sub-integration periods providing an image having a threshold signal to noise ratio.

18. The method of claim 12, wherein the implementing the second technique of angular displacement mitigation by the second jitter compensation system comprises:
controlling a motor secured with the mounting and causing adjusts to an orientation of the mounting relative to the platform based on the sensor data from the jitter sensor system.

19. The method of claim 12, wherein the activating the exposure of the image capture system to the illumination comprises adjusting over time the level of exposure of the image capture system to illumination during one or more of the multiple sub-integration periods of the capture frame.

20. A method of capturing enhanced resolution images from a moving platform, comprising:
activating a first jitter compensation system implementing a first technique of angular displacement mitigation to mitigate an effect of line of sight (LOS) angular displacement of the image capture system, comprising:
receiving, in real-time, sensor data from a jitter sensor system coupled to a mounting secured with a platform;
obtaining, during a capture frame, an angular displacement of an electro-optical image capture system secured with the mounting;
monitoring when the detected angular displacement of the image capture system, based on the sensor data, is within an angular displacement threshold envelope; and
activating exposure of the image capture system to illumination, multiple times during the capture frame, when the detected angular displacement of the image capture system is within the angular displacement threshold envelope; and
controlling a level of exposure to at least decrease the exposure of the image capture system, during the capture frame, when the detected angular displacement is not within the angular displacement threshold envelope; and
operating, in cooperation with the first jitter compensation system, a second jitter compensation system implementing a second technique of angular displacement mitigation to mitigate the effect of the LOS angular displacement of the image capture system, wherein the second technique is different than the first technique;
wherein the activating the exposure of the image capture system to illumination comprises:
activating, during the capture frame, the image capture system to expose image sensors of the image capture system when the detected angular displacement of the image capture system is within the angular displacement threshold envelope; and
wherein the controlling the level of exposure comprises deactivating, during the capture frame, the image capture system to prevent the imaging sensors from being exposed when the detected angular displacement is not within the angular displacement threshold envelope.

21. A method of capturing enhanced resolution images from a moving platform, comprising:
activating a first jitter compensation system implementing a first technique of angular displacement mitigation to mitigate an effect of line of sight (LOS) angular displacement of the image capture system, comprising:
receiving, in real-time, sensor data from a jitter sensor system coupled to a mounting secured with a platform;
obtaining, during a capture frame, an angular displacement of an electro-optical image capture system secured with the mounting;
monitoring when the detected angular displacement of the image capture system, based on the sensor data, is within an angular displacement threshold envelope; and
activating exposure of the image capture system to illumination, multiple times during the capture frame, when the detected angular displacement of the image capture system is within the angular displacement threshold envelope; and
controlling a level of exposure to at least decrease the exposure of the image capture system, during the capture frame, when the detected angular displacement is not within the angular displacement threshold envelope; and operating, in cooperation with the first jitter compensation system, a second jitter compensation system implementing a second technique of angular displacement mitigation to mitigate the effect of the LOS angular displacement of the image capture system, wherein the second technique is different than the first technique;

adjusting power levels of the illumination source system while active as a function of estimated system limitation based on periods of time the illumination source system is active.

22. A method of capturing enhanced resolution images from a moving platform, comprising:

activating a first jitter compensation system implementing a first technique of angular displacement mitigation to mitigate an effect of line of sight (LOS) angular displacement of the image capture system, comprising:

receiving, in real-time, sensor data from a jitter sensor system coupled to a mounting secured with a platform;

obtaining, during a capture frame, an angular displacement of an electro-optical image capture system secured with the mounting;

monitoring when the detected angular displacement of the image capture system, based on the sensor data, is within an angular displacement threshold envelope; and activating exposure of the image capture system to illumination, multiple times during the capture frame, when the detected angular displacement of the image capture system is within the angular displacement threshold envelope; and controlling a level of exposure to at least decrease the exposure of the image capture system, during the capture frame, when the detected angular displacement is not within the angular displacement threshold envelope; and operating, in cooperation with the first jitter compensation system, a second jitter compensation system implementing a second technique of angular displacement mitigation to mitigate the effect of the LOS angular displacement of the image capture system, wherein the second technique is different than the first technique;

adjusting the angular displacement threshold envelope as a function of a resulting resolution and a signal to noise ratio corresponding to a preceding frame captured by the image capture system.

* * * * *

UNITED STATES PATENT AND TRADEMARK OFFICE
CERTIFICATE OF CORRECTION

| | |
|---|---|
| PATENT NO. | : 11,350,034 B1 |
| APPLICATION NO. | : 16/851646 |
| DATED | : May 31, 2022 |
| INVENTOR(S) | : Patrick R. Mickel et al. |

It is certified that error appears in the above-identified patent and that said Letters Patent is hereby corrected as shown below:

On the Title Page

Column 2, item [56], in "OTHER PUBLICATIONS", at Line 2, delete "sensiving" and insert --sensing--.

Column 2, item [57], in the ABSTRACT, at Line 5, delete "ling of sight" and insert --line of sight--.

In the Specification

Column 1, Line 9, delete "15/963,364" and insert --15/963,634--.

In the Claims

In Claim 6, Column 23, Line 55, delete "1" and insert --1,--.

Signed and Sealed this
Eighteenth Day of October, 2022

Katherine Kelly Vidal
*Director of the United States Patent and Trademark Office*